Sept. 19, 1944.　　G. W. DAUGHERTY　　2,358,318
SPRAYING MACHINE
Filed Dec. 11, 1941　　3 Sheets-Sheet 1
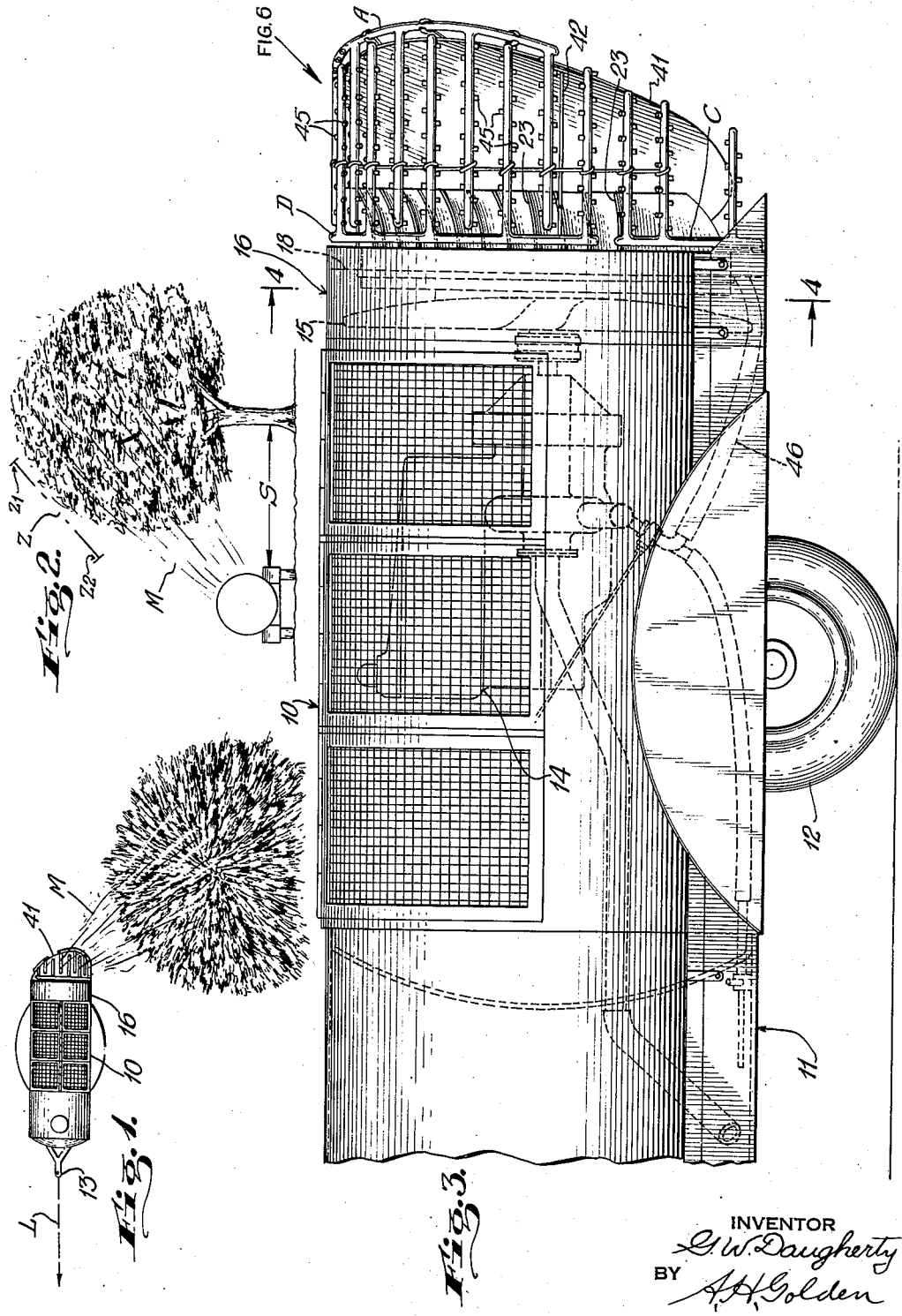

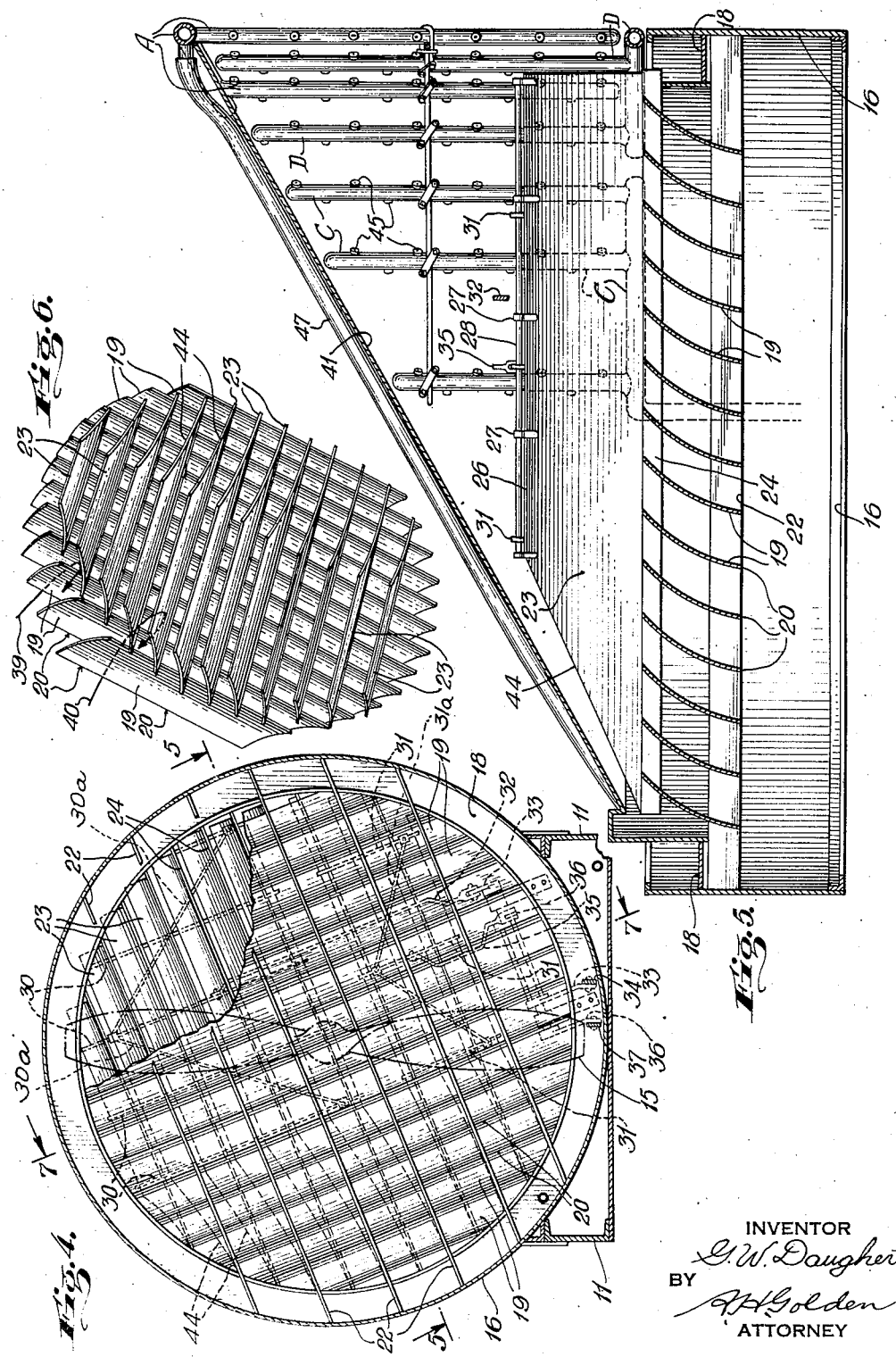

Sept. 19, 1944. G. W. DAUGHERTY 2,358,318
SPRAYING MACHINE
Filed Dec. 11, 1941 3 Sheets-Sheet 3
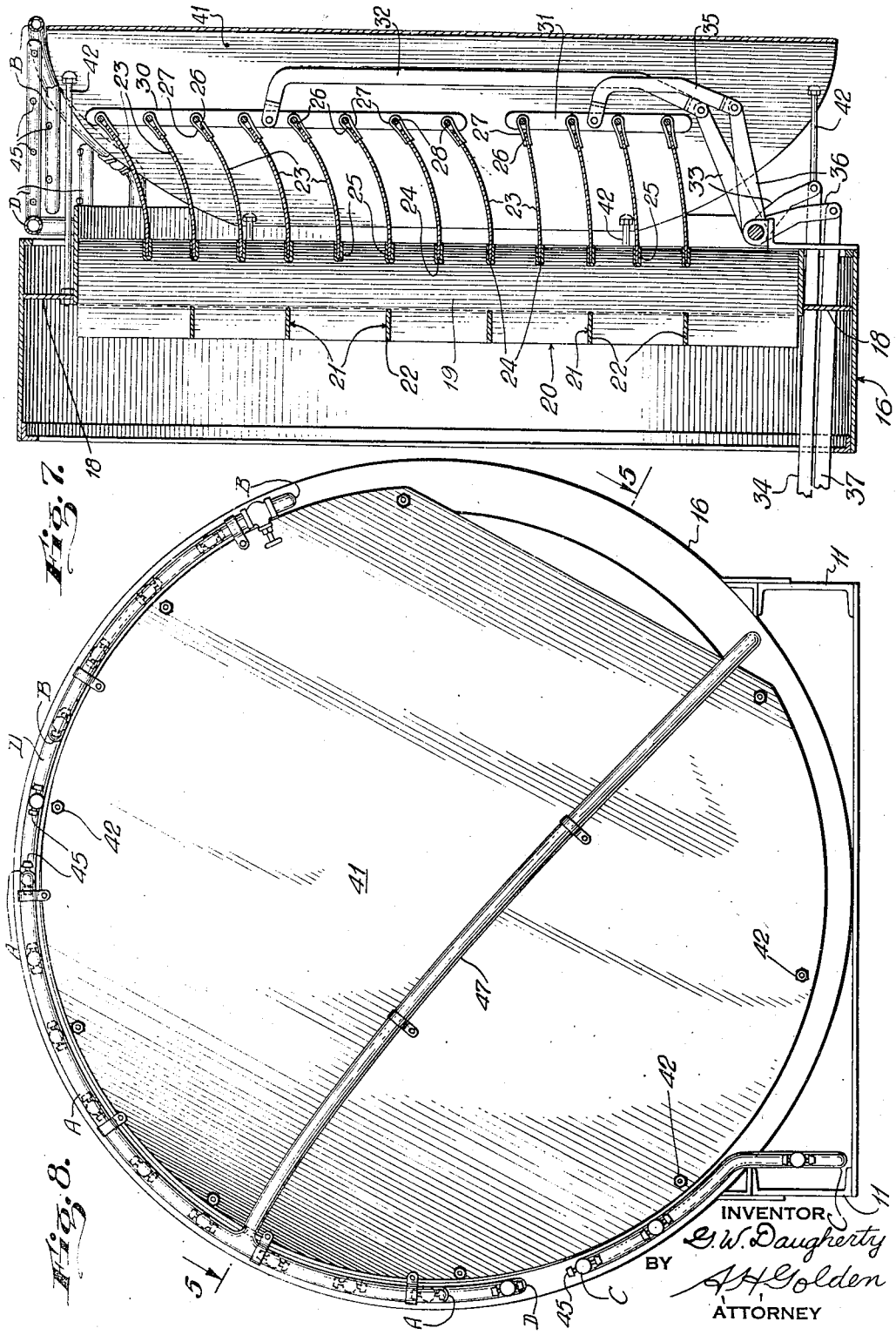

Patented Sept. 19, 1944

2,358,318

UNITED STATES PATENT OFFICE 2,358,318

SPRAYING MACHINE

George W. Daugherty, Orlando, Fla.

Application December 11, 1941, Serial No. 422,478

14 Claims. (Cl. 261—116)

This invention relates to a spraying machine of the type shown and claimed in my Patents No. 2,220,082 issued on November 5, 1940, and No. 2,331,107 issued Oct. 5, 1943.

In my Patent No. 2,220,082, I illustrate and claim a spraying and dusting machine of the tunnel type in which a blast of air generated in the tunnel, picks up spraying and dusting material to be deposited by the air on foliage. The blast of air is preferably directed outwardly to both sides of the tunnel by a series of deflectors or guide fins as they are termed in the patent, and upwardly by a series of elevator vanes. A machine of the type disclosed in my patent may be moved through an orchard or orange grove and will spray with almost complete coverage a great number of trees in an incredibly short period of time. In my Patent No. 2,331,107, I show several improvements on the earlier patent structure, devoted mainly to means for obtaining better dispersion of the spraying material in the air blast developed by the tunnel, as well as better control of the air blast.

In this application I shall disclose an improvement over the machines shown in my patents, especially conceived for use with oil sprays and for spraying the foliage of relatively high trees. Of course, those skilled in the art will readily appreciate that my invention is capable of uses with other materials and for spraying other types of trees, so that the patent to be granted me should not be limited to the particular field for which the preferred form I shall describe, is adapted. Moreover, in describing my invention, I shall set forth certain theories of operation which I now believe are sound, but I naturally do not wish my invention to be limited in scope, or be considered only in the light of those theories.

For a description of my invention I shall refer to the drawings wherein Fig. 1 is a plan view showing my spraying machine applying spraying material to a tree. Fig. 2 is an elevation showing my machine passing a tree and spraying material thereon. This view, in conjunction with Fig. 1, will be used to illustrate one particular contribution of my invention. Fig. 3 is a side view of my machine with the forward part thereof eliminated. Fig. 4 is a section taken along lines 4—4 of Fig. 3 looking in the direction of the arrows. Fig. 5 is a section taken along lines 5—5 of Fig. 4 and Fig. 8. Fig. 6 is a perspective view of parts of Fig. 3 taken along the lines of the arrow in Fig. 3 denoted by Fig. 6. Fig. 7 is a section taken along lines 7—7 of Fig. 4. Fig. 8 is a rear end view of the machine.

By referring now more particularly to the drawings, and especially to Figs. 1 and 2, I shall endeavor to explain the manner in which my machine is utilized for spraying trees, it being thought that a clear understanding of the method of utilizing my machine will lead to a better understanding of the construction thereof. Through the utilization of means which will appear hereinafter, my machine is adapted for directing the spraying material designated by the letter M in Fig. 1, at an angle considerably greater than 90 degrees from the line L along which the machine is being moved between rows of trees in an orchard or orange grove as the case may be. Because the spraying is done at the angle indicated, and in an upward direction as best shown in Fig. 2, that portion of the foliage of the tree shown in the zone Z between lines $Z_1$ and $Z_2$ in Fig. 2, may be covered quite readily with the machine positioned only the short distance S from the tree.

To best appreciate the results obtained, it will be well to consider that if the machine were to spray at substantially right angles to its path of movement L, then in order to reach the upper portion of zone Z, the spraying material M would have to drive through all the foliage of the tree. This is best understood by a study of Fig. 2. It is readily admitted that practically everything that is accomplished by this diagonal spraying may be achieved by the usual right angle spraying through the expedient of increasing the distance S between the machine and the tree. Unfortunately, in the usual orchard or orange grove, there is not sufficient distance between the rows of trees to allow for such an increase in the distance S. Because the machine must be moved rather closely to the trees to be sprayed, the diagonal spraying method best illustrated in Fig. 1 seems the best solution of the problem. I have found that it eliminates the necessity for driving the spraying material through the trees at high pressure to reach the upper zone Z with the resultant harm to the foliage and fruit that takes place with such extreme pressure spraying.

In order to obtain diagonal spraying, as outlined by me, the spraying machine of my invention preferably directs all the air blast generated through the tunnel to one side of the tunnel. While this arrangement is preferred, those skilled in the art will readily appreciate that it is within the scope of my contribution to direct less than the entire air blast wherever it may be necessary for particular purposes. For best directing the air blast in an upward and diagonal direction, I utilize what I term a series of deflectors mounted cross-wise relatively to that end of the tunnel through which the air blast leaves the tunnel. These deflectors are mounted at an angle both to the horizontal and the vertical, and are preferably curved upwardly so as to direct the air blast upwardly as well as angularly outwardly to one side of the tunnel. For imparting that additional lift to the air blast which cannot be imparted by the deflectors, and which is extremely necessary for certain types of spraying, I utilize a series of what I prefer to term elevator vanes. These vanes may be substantially the same in construction as the deflector vanes but are mounted at an angle to the deflectors, and are curved upwardly so as to better impart elevation to the air blast additional to that elevation previously imparted to the air blast by the deflectors.

I have found that by mounting the elevator vanes at substantially 90° to the deflector vanes, the elevator vanes receive the full blast of the air on their curved surfaces and are therefore more effective in imparting substantial further elevation or lift to the air blast. These curved surfaces actually are positioned so that, per se, they tend to direct the air upwardly and to that side of the air tunnel opposite the side toward which it is directed by the deflectors. By actual experience I have found however that the air blast will remain directed toward that side of the tunnel to which it is directed by the deflectors but to a considerably higher level due to the action of the elevator vanes. The actual direction and lift imparted to the air blast is of course a function of the curvatures and angular positions of the deflectors and elevator vanes, as will be fully appreciated, and those skilled in the art may readily change the positions and curvatures of the deflectors and vanes in accordance with the teachings of my invention to meet particular special conditions.

In order to better limit and control the movement of the air blast outwardly of the machine I prefer to use what I term an end limit plate which is positioned in an upward and outward angular position relatively to the vertical plane of the open end of the tunnel. The end limit plate forms with the vertical plane of the end of the tunnel, an upwardly and angularly graduated opening through which the air blast is directed by the deflectors and elevator vanes as has already been indicated.

The spraying material is best dispersed through the air blast by mounting a series of nozzles circularly about the end of the tunnel and in several banks extending between the end of the tunnel and the end limit plate which I have already described. These banks of nozzles are naturally in the path of the air blast directed outwardly by the horizontal vanes and deflectors so that the material issuing from the nozzles is readily picked up by the air blast and moved toward the trees to be sprayed.

In describing my invention I shall not lay particular emphasis on the construction of the air tunnel, the means for creating the air blast, the means for feeding the spraying material to the nozzles, and various other constructional features such as the relation between the effective diameter of the air tunnel and the propeller which I preferably use for generating the air blast, since all such features are well described and claimed per se in my patents. In this application I shall limit my detailed description to the particular features whereby my new combination results, and which combination forms the contribution I have made over my earlier patents.

Referring now more particularly to the drawings and especially Figs. 1 and 3, my air tunnel which I designate generally by the reference numeral 10, is mounted on a chassis 11 equipped with wheels 12 and adapted to be supported at the hitch 13 on a suitable vehicle for moving the air tunnel through an orchard. An internal combustion engine 14 is preferably used for rotating a suitable propeller 15 within the air tunnel 10 and for generating a blast of air which moves through the open end of the tunnel towards the trees of the orchard as directed by the deflectors and elevate vanes which I have discussed generally.

Referring now to Figs. 4, 5, 6 and 7, there is illustrated an attachment 16 which when secured to the tunnel 10 forms a continuous and effective integral part thereof. The particular detailed construction of the attachment 16 is of course not important, but it is preferably fabricated as is shown in the several figures of drawings. The circular plate surface 18 decreases the cross-sectional area of the tunnel through which the air blast may move outwardly of the tunnel to an area somewhat smaller than that of the main part of the tunnel, this being in accordance with the teachings of my later patent.

The curved deflectors of my invention are best shown in perspective in Fig. 6, and are designated by reference numeral 19. The deflectors 19 are preferably mounted to extend cross-wise over the entire area of the tunnel opening and preferably with their edges 20 at an angle of 62½° to the horizontal. This angle is best illustrated looking outwardly from the inside of the machine as shown in Fig. 4. In Fig. 5 the deflectors 19 are shown in cross-section and their relation to the end of the tunnel and to each other may best be seen in that figure. A series of suitable cross-strips 22 may be mounted across the open end of the tunnel and the deflectors 19 slit as at 21 to straddle the strips 22 and to be secured relatively thereto in proper operating position.

Mounted outwardly beyond the deflectors 19 are a series of elevator vanes each designated by reference numeral 23 and best illustrated in perspective in Fig. 6. Each of the elevator vanes 23 has an inward edge 24 extending cross-wise preferably relatively to the tunnel in the same manner as the edge 20 of each of the deflectors 19. The edge 24 of each elevator vane is preferably inserted in slits 25 formed in the deflectors 19, and through suitable means is thus secured relatively to those deflectors. Of course, other means might readily be designed for otherwise securing the elevator vanes 23 beyond the deflectors 19 all as will be appreciated by those skilled in the art. I have found the particular means I have developed to be rather effective.

The elevator vanes 23, as well as the deflectors 19, are of course of different lengths, depending on their postion at the end of the tunnel as will be fully appreciated. The vanes 23 are made of relatively flexible material, and secured to each of their outer edges 26 are a series of clips 27 connected to a rod 28. The series of rods 28, there being one for each elevator vane 23, are secured to one of two sets of tie bars 30, 31 as best illustrated in full lines in Fig. 7 and in dotted lines in Fig. 4. The set of tie bars 30 is interconnected by suitable angular struts 30a, and one of the tie bars 30 is pivoted to a connecting rod 32 which through a suitable bell crank lever 33 is operated by the rod 34. The tie bars of set 31 are similarly interconnected by a strut 31a and one of the tie bars is pivoted to a connecting rod 35, which is in operative relation to a bell crank lever 36 and a rod 37. Those understanding the construction and operation of my machine illustrated in my earlier application, will understand that through operation of the rods 34 and 37, bell crank levers 33 and 36, connecting rods 32 and 35, and sets of tie bars 30 and 31, the several vanes 23 may be flexed to assume different curvatures. Thus, the upper group of vanes 23 in Fig. 7 has a rather considerable curvature whereas the lower group of vanes 23 has practically no curvature. Naturally, those vanes with the greater curvature will impart more lift or elevation to the air blast directed toward those vanes by the deflectors 19. I do not deem it necessary to show in detail the means for moving and securing in position the rods 34 and 37, since the adjustment of the vanes is fully set forth in my earlier application.

Referring now more particularly to Figs. 4, 5 and 6 as well as Fig. 7, it will be noted that the several elevator vanes 23, are mounted with their inner edges 24 at 90° relatively to the corresponding edges 20 of the deflectors 19. Similarly, it will be noted, that the curvature of the several vanes 23 is in such relation to the deflectors 19, as to direct the air upwardly and angularly toward the side of the machine opposite to that to which it is directed by the deflectors, all as I have already outlined generally. The action and cooperation of the elevator vanes and deflectors is best illustrated in the perspective drawing of Fig. 6. There it will be seen that the deflectors 19 first impart a particular directional movement to the air blast to one side of the machine as illustrated by the arrows 39 and 40. When the blast of air contacts the elevator vanes 23, it strikes those elevator vanes at such an angle that the entire curvature of the vanes tends to direct the air toward the opposite side of the machine but is actually most effective in directing the air blast upwardly. Thus, the direction of movement of the air blast remains toward the side of the machine toward which it is first directed by said deflectors, despite the effect of the elevator vanes. The actual upward direction imparted the air blast will depend of course on the curvature as well as the angularity of the elevator vanes 23, the curvature being readily adjustable to meet particular conditions. In this preferred form of my invention, I have found it desirable to make adjustable only the vane curvatures, but it is conceivable that other elements of my combination may, for special conditions, be fabricated so as to be readily adjustable. Through actual practice and use I have discovered that the particular angular relation between the vanes 23 and the deflectors 19 by me illustrated in this application is most effective for the reasons I have set forth. It should be reiterated however, that my invention must not be limited by the theory and explanation which I have presented.

At the end of the tunnel and beyond the deflectors 19 and elevator vanes 23, I secure what I term an end limit plate 41. This end limit plate may be secured relatively to the end of the tunnel by any one of several means but I prefer to utilize the series of tie rods 42 extending between the circular plate 18 and the end limit plate 41 at a series of circumferentially spaced points. As has already been set forth generally, the end limit plate 41 is so positioned as to lie at an angle relatively to the end of the tunnel and to define an upwardly angularly graduated opening between it and the end of the tunnel.

Lying in this opening are the series of elevator vanes 23, all of which are cut away at their edges 44 so as to allow for the particular mounting of the end limit plate 41 all as will be readily appreciated by those skilled in the art. In Fig. 5 it will be well noted that the general angular direction imparted the air blast by the series of deflectors 19 is substantially parallel to the angular position of the end limit plate 41 relatively to the end of the tunnel. The elevator vanes 23 will of course impart upward lift to the air blast in addition to the upward lift imparted by the deflectors 19.

For feeding spraying material into the directed air stream I utilize what I term four banks of pipes designated respectively by letters A, B, C and D. These banks of pipes include horizontally extending portions into which are fitted a considerable number of nozzles 45. It will readily be observed that the nozzles are in the path of the air blast or substantially adjacent to that path, so that spraying material will be picked up by the blast of air or be drawn by that blast of air into itself, and carried towards the trees being sprayed. The pulling of the material into the air blast is set forth in detail and claimed broadly in my earlier pending application and will not be described in more detail here. For moving the spraying material into the several banks A, B, C and D of the pipe, and to the nozzles 45, I utilize means similar to that shown in my earlier application and shown here as including a pipe 46. Certain of the banks of pipe are reached through a rubber hose 47 extending across the back of the end plate 41 as best shown in Fig. 5 and Fig. 8. I do not think it necessary to describe in further detail the particular means used for supporting and bracing the pipes, since suitable means may readily be devised by any skilled mechanic.

It is thought that from the description presented, the operation and structure of my invention will now be apparent. Naturally, I consider my contribution to the art a relatively broad one and feel myself entitled to claims which will prevent the utilization of that contribution in such other forms as may readily occur to those skilled in the art.

I now claim:

1. In a machine of the class described, an air tunnel of circular cross section mounted on a vehicle for movement through an orchard or the like and having an open end, means for creating an air blast through said tunnel and outwardly of said open end, means for feeding spraying material to a point where said blast of air will pick up said material and form it into a fine fog of material, and an end limit plate secured with a portion of its periphery juxtaposed to the end of the tunnel and with its surface at such an angle relatively to the open end of the tunnel through which the air blast leaves the tunnel whereby to form with the end of the tunnel an upwardly angularly graduated opening for the flow of the air blast, whereby to direct the air blast upwardly and to one side of said tunnel.

2. In a machine of the class described, an air tunnel mounted on a vehicle for movement through an orchard or the like, means for creating an air blast through said tunnel, means for feeding spraying material to a point where said blast of air will pick up said material and form it into a fine fog of material, a series of deflectors secured with their inner edges extending crosswise to the open end of the tunnel at an angle to both the vertical and horizontal, the said deflectors extending upwardly from said inner edges whereby to direct the air blast leaving the tunnel upwardly and angularly to one side of said tunnel, and a series of elevator vanes positioned crosswise to the open end of the tunnel just beyond and angularly relative to said deflectors with their surfaces extending upwardly and angularly toward the opposite side of the air tunnel to impart movement to said air blast upwardly and toward the said opposite side of said air tunnel, whereby said elevator vanes receive the air blast as directed by said deflectors for imparting further upward lift thereto, said air blast remaining directed toward that side of said air tunnel to which it is first directed by said deflectors.

3. In a machine of the class described, an air tunnel mounted on a vehicle for movement through an orchard or the like, means for creating an air blast through said tunnel, means for feeding spraying material to a point where said blast of air will pick up said material and form it into a fine fog of material, a series of deflectors secured with their inner edges extending crosswise to the open end of the tunnel at an angle to both the vertical and horizontal, the said deflectors extending upwardly from said inner edges whereby to direct the air blast leaving the tunnel upwardly and angularly to one side of said tunnel, and a series of elevator vanes positioned crosswise to the open end of the tunnel just beyond said deflectors and at substantially right angles thereto, and with their surfaces extending upwardly to impart movement to said air blast upwardly and toward the opposite side of said air tunnel, whereby said elevator vanes receive the air blast as directed by said deflectors for imparting further upward lift thereto, said air blast remaining directed toward that side of said air tunnel to which it is first directed by said deflectors.

4. In a machine of the class described, an air tunnel mounted on a vehicle for movement through an orchard or the like, means for creating an air blast through said tunnel, means for feeding spraying material to a point where said blast of air will pick up said material and form it into a fine fog of material, a series of curved deflectors secured crosswise to the open end of the tunnel at an angle to both the vertical and horizontal and with their curved surfaces positioned upwardly whereby to direct the air blast leaving the tunnel upwardly and angularly to one side of said tunnel, a series of curved elevator vanes positioned crosswise to the open end of the tunnel just beyond and angularly relatively to said deflectors and with their curved surfaces in a position to impart movement to said air blast upwardly and toward the opposite side of said air tunnel, whereby said elevator vanes receive the air blast as directed by said deflectors for imparting further upward lift thereto, said air blast remaining directed toward that side of said air tunnel to which it is first directed by said deflectors.

5. In a machine of the class described, an air tunnel mounted on a vehicle for movement through an orchard or the like, means for creating an air blast through said tunnel, means for feeding spraying material to a point where said blast of air will pick up said material and form it into a fine fog of material, a series of curved deflectors secured crosswise to the open end of the tunnel at an angle to both the vertical and horizontal and with their curved surfaces positioned upwardly whereby to direct the air blast leaving the tunnel upwardly and angularly to one side of said tunnel, a series of curved elevator vanes positioned crosswise to the open end of the tunnel just beyond said deflectors at substantially right angles to said deflectors and with their curved surfaces directed upwardly and toward the opposite side of said tunnel to impart movement to said air blast upwardly and toward the said opposite side of said air tunnel, whereby said elevator vanes receive the air blast as directed by said deflectors for imparting further upward lift thereto, said air blast remaining directed toward that side of said air tunnel to which it is first directed by said deflectors.

6. In a machine of the class described, an air tunnel mounted on a vehicle for movement through an orchard or the like, means for creating an air blast through said tunnel, means for feeding spraying material to a point where said blast of air will pick up said material and form it into a fine fog of material, a series of curved deflectors secured crosswise to the open end of the tunnel at an angle to both the vertical and horizontal and with their curved surfaces positioned upwardly whereby to direct the air blast leaving the tunnel upwardly and angularly to one side of said tunnel, and an end limit plate secured at a portion of its periphery in substantially closing relation to the end of the tunnel and extending angularly from said portion outwardly and upwardly relatively to the end of the tunnel, leaving an upwardly and angularly graduated space between the said end limit plate and the end of the tunnel with the said end plate positioned substantially parallel to the direction imparted the air blast by said deflectors.

7. In a machine of the class described, an air tunnel mounted on a vehicle for movement through an orchard or the like, means for creating an air blast through said tunnel, means for feeding spraying material to a point where said blast of air will pick up said material and form it into a fine fog of material, a series of curved deflectors secured crosswise to the open end of the tunnel at an angle to both the vertical and horizontal and with their curved surfaces positioned upwardly whereby to direct the air blast leaving the tunnel upwardly and angularly to one side of said tunnel, a series of curved elevator vanes positioned crosswise to the open end of the tunnel just beyond said deflectors and with their curved surfaces in a position for receiving the air blast as directed by said deflectors and imparting upward lift thereto, and an end limit plate secured at a portion of its periphery in substantially closing relation to the end of the tunnel and extending angularly from said portion outwardly and upwardly relatively to the end of the tunnel, leaving an upwardly and angularly graduated space between the said plate and the end of the tunnel, said elevator vanes being tapered at one end to lie in juxtaposed relation to that portion of the plate closest to the end of the tunnel.

8. In a machine of the class described, an air tunnel mounted on a vehicle for movement through an orchard or the like, means for creating an air blast through said tunnel, means for feeding spraying material to a point where said blast of air will pick up said material and form it into a fine fog of material, a series of curved deflectors secured crosswise to the open end of the tunnel at an angle to both the vertical and horizontal and with their curved surfaces positioned upwardly whereby to direct the air blast leaving the tunnel upwardly and angularly to one side of said tunnel, a series of curved elevator vanes positioned crosswise to the open end of the tunnel just beyond said deflectors and with their curved surfaces in a position for receiving the air blast as directed by said deflectors and imparting upward lift thereto, and an end limit plate secured at a portion of its periphery in substantially closing relation to the end of the tunnel and extending angularly from said portion outwardly and upwardly relatively to the end of the tunnel, leaving an upwardly and angularly graduated space between the said plate and the end of the tunnel.

9. In a machine of the class described, an air tunnel mounted on a vehicle for movement through an orchard or the like, means for creating an air blast through said tunnel, means for feeding spraying material to a point where said blast of air will pick up said material and form it into a fine fog of material, an end limit plate secured at such an angle relatively to the open end of the tunnel through which the air blast leaves the tunnel whereby to form with the end of the tunnel an upwardly angularly graduated opening for the flow of the air blast, whereby to direct the air blast upwardly and to one side of said tunnel, a series of curved deflectors between said end plate and the end of the air tunnel secured crosswise to the open end of the tunnel at an angle to both the vertical and horizontal and with their curved surfaces positioned upwardly whereby to direct said air blast substantially parallel to the said end limit plate and toward the greatest opening between the end limit plate and the end of the tunnel.

10. In a machine of the class described, an air tunnel mounted on a vehicle for movement through an orchard or the like, means for creating an air blast through said tunnel, means for feeding spraying material to a point where said blast of air will pick up said material and form it into a fine fog of material, an end limit plate secured at such an angle relatively to the open end of the tunnel through which the air blast leaves the tunnel whereby to form with the end of the tunnel an upwardly angularly graduated opening for the flow of the air blast, whereby to direct the air blast upwardly and to one side of said tunnel, a series of curved deflectors between said end plate and the end of the air tunnel secured crosswise to the open end of the tunnel at an angle to both the vertical and horizontal and with their curved surfaces positioned upwardly whereby to direct said air blast substantially parallel to the said end limit plate and toward the greatest opening between the end limit plate and the end of the tunnel, and a series of curved elevator vanes positioned crosswise to the open end of the tunnel between said end limit plate and said deflectors for receiving the air blast as directed by said deflectors and imparting further upward lift thereto.

11. In a machine of the class described, an air tunnel mounted on a vehicle for movement through an orchard or the like, means for creating an air blast through said tunnel, means for feeding spraying material to a point where said blast of air will pick up said material and form it into a fine fog of material, a series of curved deflectors secured in spaced parallel relation across the open end of the tunnel and tilted at an angle to both the horizontal and vertical with the curved surfaces thereof positioned to direct the air blast upwardly and to one side of said tunnel, and a series of curved elevator vanes positioned in parallel relation to one another across the open end of the tunnel just beyond at an angle relatively to the said deflectors and with their curved surfaces directed toward the other side of the tunnel and in a position for receiving the air blast as directed by said deflectors for imparting further upward lift thereto while tending to direct said air blast to the said other side of said air tunnel.

12. In a machine of the class described, an air tunnel mounted on a vehicle for movement through an orchard or the like, means for creating an air blast through said tunnel, means for feeding spraying material to a point where said blast of air will pick up said material and form it into a fine fog of material, a series of curved deflectors secured in spaced parallel relation across the open end of the tunnel and tilted at an angle to both the horizontal and vertical with the curved surfaces thereof positioned to direct the air blast upwardly and to one side of said tunnel, and a series of curved elevator vanes positioned in parallel relation to one another across the open end of the tunnel just beyond the said deflectors and at right angles to said deflectors with their curved surfaces extending upwardly and angularly toward the opposite side of said tunnel, whereby to receive the air blast as directed by said deflectors and impart further upward lift thereto.

13. In a machine of the class described, an air tunnel mounted on a vehicle for movement through an orchard or the like, means for creating an air blast through said tunnel, an end limit plate secured at such an angle relatively to the open end of the tunnel through which the air blast leaves the tunnel whereby to form with the end of the tunnel an upwardly angularly graduated opening for the flow of the air blast, whereby to direct the air blast upwardly and to one side of said tunnel, a series of nozzles positioned between said end plate and the end of said tunnel, and means including pipes leading to said nozzles for feeding spray material to said nozzles.

14. In a machine of the class described, an air tunnel mounted on a vehicle for movement through an orchard or the like, means for creating an air blast through said tunnel, a series of curved deflectors secured crosswise to the open end of the tunnel at an angle to both the vertical and horizontal and with their curved surfaces positioned upwardly whereby to direct the air blast leaving the tunnel upwardly and angularly to one side of said tunnel, an end limit plate secured at the end of the tunnel and extending angularly outwardly and upwardly relatively to the end of the tunnel leaving an upwardly and angularly graduated space between the said plate and the end of the tunnel in which space said deflectors are positioned, a series of pipes extending between the said end plate and the end of the tunnel, spray nozzles in said pipes through which spraying material is fed into the air blast, and means for feeding the spraying material to said pipes and nozzles.

GEORGE W. DAUGHERTY.